(12) United States Patent
Turissini et al.

(10) Patent No.: US 10,447,486 B2
(45) Date of Patent: Oct. 15, 2019

(54) REMOTE ATTESTATION OF A SECURITY MODULE'S ASSURANCE LEVEL

(71) Applicant: SPYRUS, Inc., San Jose, CA (US)

(72) Inventors: Daniel Elvio Turissini, McLean, VA (US); William Reid Carlisle, St. Petersburg, FL (US); Burton George Tregub, Encino, CA (US)

(73) Assignee: SPYRUS, Inc., San Jose, CA (US)

( * ) Notice: Subject to any disclaimer, the term of this patent is extended or adjusted under 35 U.S.C. 154(b) by 0 days.

(21) Appl. No.: 16/039,335

(22) Filed: Jul. 19, 2018

(65) Prior Publication Data
US 2019/0028281 A1 Jan. 24, 2019

Related U.S. Application Data

(60) Provisional application No. 62/534,317, filed on Jul. 19, 2017.

(51) Int. Cl.
| | | |
|---|---|---|
| *H04L 29/06* | (2006.01) | |
| *H04L 9/32* | (2006.01) | |
| *H04L 9/08* | (2006.01) | |
| *G06F 21/00* | (2013.01) | |
| *G09C 1/00* | (2006.01) | |

(52) U.S. Cl.
CPC ............ *H04L 9/3268* (2013.01); *G06F 21/00* (2013.01); *G09C 1/00* (2013.01); *H04L 9/0877* (2013.01)

(58) Field of Classification Search
CPC ....... G06F 12/1408; G06F 2009/45587; G06F 21/57; G06F 21/64; G06F 9/455; G06F 9/45558

USPC ............................ 713/184, 190; 726/2, 9, 19
See application file for complete search history.

(56) References Cited

U.S. PATENT DOCUMENTS

| | | | | |
|---|---|---|---|---|
| 5,664,017 A * | 9/1997 | Gressel | ................. | H04L 9/0833 380/285 |
| 5,852,665 A * | 12/1998 | Gressel | ................. | H04L 9/0894 380/30 |
| 6,938,156 B2 * | 8/2005 | Wheeler | ................. | G06F 21/32 380/282 |
| 6,996,710 B1 * | 2/2006 | Ellison | ................. | H04L 9/0861 713/156 |
| 7,194,759 B1 * | 3/2007 | Chess | ..................... | H04L 9/321 705/1.1 |
| 7,461,250 B1 * | 12/2008 | Duane | ................... | H04L 9/3263 713/157 |
| 7,886,153 B2 * | 2/2011 | Miyazawa | .......... | H04L 63/0428 380/282 |
| 8,341,715 B2 * | 12/2012 | Sherkin | ............... | G06F 21/6218 380/270 |
| 8,443,198 B2 * | 5/2013 | Ginter | ................. | G06F 21/6209 713/182 |
| 8,782,399 B2 * | 7/2014 | Lamb | ..................... | H04L 9/006 713/156 |

(Continued)

*Primary Examiner* — Gary S Gracia
(74) *Attorney, Agent, or Firm* — Law Office of Robert Rose; Robert J. Rose

(57) ABSTRACT

A method by which a hardware security module can attest remotely to its measure of trust as determined by its security certifications and the Level of Assurance it can be relied on to support without the human witnessing elements that are currently used to validate this trust. In a further embodiment the Level of Assurance can be transported to a second hardware security module.

1 Claim, 3 Drawing Sheets

(56) References Cited

U.S. PATENT DOCUMENTS

| | | | | |
|---|---|---|---|---|
| 8,856,918 B1* | 10/2014 | Efstathopoulos | G06F 21/31 | 713/184 |
| 9,363,087 B2* | 6/2016 | Hawblitzel | G06F 21/575 | |
| 9,374,228 B2* | 6/2016 | Pendarakis | H04L 63/062 | |
| 9,680,872 B1* | 6/2017 | Roth | H04L 63/20 | |
| 9,692,599 B1* | 6/2017 | Krahn | H04L 9/3247 | |
| 10,009,179 B2* | 6/2018 | Acar | G06Q 20/3227 | |
| 10,148,442 B2* | 12/2018 | Hawblitzel | G06F 21/575 | |
| 2002/0044648 A1* | 4/2002 | Arazi | H04L 9/3013 | 380/30 |
| 2006/0129804 A1* | 6/2006 | Satkunanathan | G06F 21/33 | 713/156 |
| 2007/0005980 A1* | 1/2007 | Miyazawa | H04L 63/0428 | 713/176 |
| 2008/0162947 A1* | 7/2008 | Holtzman | G06F 21/10 | 713/193 |
| 2009/0222903 A1* | 9/2009 | Sherkin | G06F 21/335 | 726/10 |
| 2010/0325698 A1* | 12/2010 | Ginter | G06F 21/10 | 726/4 |
| 2013/0086377 A1* | 4/2013 | Cilfone | H04L 9/085 | 713/156 |
| 2013/0262860 A1* | 10/2013 | Lamb | H04L 9/006 | 713/156 |
| 2014/0089660 A1* | 3/2014 | Sarangshar | H04L 9/3234 | 713/156 |
| 2014/0108784 A1* | 4/2014 | Pendarakis | H04L 63/062 | 713/156 |
| 2014/0122873 A1* | 5/2014 | Deutsch | H04L 63/20 | 713/158 |
| 2014/0281500 A1* | 9/2014 | Ignatchenko | H04L 9/3263 | 713/156 |
| 2016/0065589 A1* | 3/2016 | Leighton | G06F 9/45558 | 726/4 |
| 2016/0099811 A1* | 4/2016 | Hawblitzel | G06F 21/575 | 713/176 |
| 2016/0248592 A1* | 8/2016 | Hawblitzel | G06F 21/575 | |
| 2016/0323110 A1* | 11/2016 | Campagna | H04L 9/3247 | |
| 2017/0104580 A1* | 4/2017 | Wooten | G06F 8/65 | |
| 2017/0155513 A1* | 6/2017 | Acar | G06Q 20/3227 | |
| 2017/0257360 A1* | 9/2017 | Gattu | H04L 63/0823 | |
| 2017/0337380 A1* | 11/2017 | Domke | H04L 9/0869 | |
| 2018/0041812 A1* | 2/2018 | Brown | H04N 21/482 | |
| 2018/0167208 A1* | 6/2018 | Le Saint | H04L 9/0844 | |
| 2018/0287802 A1* | 10/2018 | Brickell | H04L 9/14 | |
| 2018/0351748 A1* | 12/2018 | Pai | H04L 9/3247 | |
| 2019/0020647 A1* | 1/2019 | Sinha | H04L 63/0435 | |
| 2019/0028281 A1* | 1/2019 | Turissini | H04L 9/3268 | |
| 2019/0065406 A1* | 2/2019 | Steiner | G06F 12/1408 | |
| 2019/0074980 A1* | 3/2019 | Loreskar | H04L 9/006 | |

* cited by examiner

REMOTE ATTESTATION OF A SECURITY MODULE'S ASSURANCE LEVEL

This application claims the benefit of and incorporates by reference the text of U.S. Provisional Patent Application No. 62/534,317, filed Jul. 19, 2017, titled "Remote Attestation Of A Security Module Level Of Assurance".

FIELD OF INVENTION

The field of the invention is hardware security modules that permit remote attestation of the module's assurance level.

BACKGROUND

Government, business and such diverse industries as health care and power generation, which are responsible for operating with critical industrial, business, defense or personally identifiable information have an increased responsibility and liability to protect such data and transactions among people and, more recently, among robotic machines. The principle defense mechanisms are authentication techniques that mitigate threats from the proliferation of cyber-attacks, both malicious and non-malicious, which threaten the privacy of our citizenry and the protection of our critical infrastructure. Authentication, and enforcing the highest level of assurance for the accurate credentialing and identity of the persons and machine devices transacting on public and private networks, are, along with data confidentiality, the most important processes necessary to achieve cybersecurity.

A Level of Assurance ("LoA" or, alternatively, an assurance level "AL") as used in this disclosure, describes the degree of confidence in the processes leading up to and including a transaction. It is defined by the framework of international standard ISO/IEC 29115, and U.S. government standard NIST SP 800-63, both of which are incorporated herein by reference. In short, a level of assurance provides assurance within a degree of probability, that the entity claiming a particular identity is the entity to which that identity was assigned. Proving someone is who they say they are or a process occurred as intended—especially remotely, via a digital service—is fraught with opportunities for an attacker to successfully impersonate someone, something, or a process.

The components of identity assurance are implementation specific, and as such it is recognized that a Level of Assurance is not a single number, but rather can vary depending upon the context. In the newly released NIST SP 800-63-3 guidelines, for example, there can be an assurance level for identity proofing (termed an "IAL" Identification Assurance Level"), for authentication process (termed an "AAL" Authentication Assurance Level), and for federation process (termed an "FAL" Federation Assurance Level). Consequently Assurance Level (or "AL") is meant broadly to refer to assurance levels however denoted or calculated.

Whether dealing with military command and control, remote medical processes, or IoT machine-to-machine transactions, proper identification and credentialing of these entities uniquely enables the ability to achieve accurate, consistent, repeatable rule-based operations. Such vetted credentialing also reduces the liabilities from risks associated with the communications of information over network environments to specific destination devices without the dangers of hijacking or masquerading.

In security environments, authentication is generally provided by cryptographic functions, such as public key pairs and digital certificates, issued under the X.509 standards. X.509 is a standard that defines the format of public key certificates. An X.509 certificate contains a public key and an identity (a hostname, or an organization, i.e., federation, or an individual), and is either signed by a certificate authority or self-signed. When a certificate is signed by a trusted certificate authority, or validated by other means, someone holding that certificate can rely on the public key it contains to establish secure communications with another party, or validate documents digitally signed by the corresponding private key.

Cryptographic secret information, including private keys and the symmetric encryption key, are, for the highest levels of security protection assurance, created and stored within the boundary of a hardware security module ("HSM") tested and certified for robustness by a national laboratory such as the U.S. National Institute of Standards and Technology under FIPS 140-2 Level 1, 2, 3 or 4. It is understood by those of ordinary skill in the art associated with this disclosure that an HSM differs from a trusted computing base, such as a Trusted Platform Module ("TPM") conforming to specifications of the Trusted Computing Group in a least four respects: an HSM is hardware, while a TPM could be either hardware or software, a TPM contains no root of trust such as a certification from a validating authority, if the TPM carries an encryption key all usage of that key is outside the boundary of the TPM, and an HSM can have stored within its boundary an attestation key which is bound to the certificate and can be leveraged to carry a validated assurance level.

A metric for trustworthiness or a defined government and industry Level of Assurance measurement describes multiple identity authentication assurance levels for e-government transactions which can also be generally applied to other organizational or machine environments. An example of this is NIST Special Publication 800-63. It is obvious that specification of levels could change, but as an exemplar it is worth noting that each assurance level describes the degree of certainty that the user (or device) contains and makes available an identifier (a credential in this context) that describes their identity. In this context, assurance is defined as (1) the degree of confidence in the vetting process used to establish the identity of the individual (or device) to whom the credential was issued, and (2) the degree of confidence that the individual (or device) who uses the credential is the individual (or device) to whom the credential was issued. For example, in that schema, Level of Assurance LoA1 offers little or no confidence in the asserted identity's validity. Level of Assurance LoA2 offers some confidence in the asserted identity's validity. Level of Assurance LoA3 offers high confidence in the asserted identity's validity. Level of Assurance LoA4 offers very high confidence in the asserted identity's validity.

Example physical embodiments of an HSM for identification and confidentiality is a smart card registered to each user under personally witnessed oversight such as a face-to-face process used for a driver license or a Global Access card. In a government environment, this card has been named a Common Access Card "CAC", or a Personal Identity Verification card "PIV", or a similar descriptor, and has been qualified to provide the necessary security protection within its physical boundary. It generates authentication and digital signature key pairs on the card and encryption cryptographic key pairs within an extended hardware security boundary supervised by a credential provider, such as a trusted certificate authority. Typically the same credential provider signs the corresponding digital certificates. Under appropriate circumstances and consistent with applicable security policies, however, it is possible for a digital certificate to be signed by a second certificate authority. However accomplished, this binds the specific user to a specific card that contains cryptographic authentication information unique to that user as their credentials. The user is responsible for keeping their access password private and under their exclusive care.

Even with a secure escrow of the encryption private cryptographic key to a physically and electronically secure server, these critical cryptographic parameters belong specifically to the entity who owns the credential cryptographic module and therefore achieves a one-to-one unique and authentic association between cryptographic keys stored within the hardware security module, the hardware security module itself, and the entity.

The increased mobility of workers, consultants, warfighters or health care providers, however, requires that they have the means to maintain their mobile credentials, their cryptographic keys for authentication and security, when using devices such as smartphones and tablets. Given the ever-changing diversity, connectivity, and computing power of mobile devices, it is critical for the content of these devices to be provably identified and secured remotely, and the integrity of the data communications to be protected.

The form factor of a credit-card sized smart card device may not be compatible with or acceptable to interface with these target devices and may need to be replaced. A more versatile HSM might have various form factors and interfaces, for example MicroSD, compatible with tablets, smartphones, PC's and IoT controllers, either in embedded or peripheral embodiments, such as the Rosetta HSM manufactured by SPYRUS, Inc. of San Jose, Calif.

For millions of owners of credit-card sized smart card devices, located globally, exchanging their current smart cards for a different device (referred to herein as a "token") by manual registration and face-to-face re-vetting of the owner it is not economically feasible. What is needed therefore is a method to create new cryptographic credentials remotely and securely for authentication, digital signature, encryption, and device identity that are derived from the original credentials, thereby maintaining the chain of trust for identifying and authenticating the owner, as well as a method to remotely and securely authenticate the original credentials. The new derived credentials must have the same Assurance Level as the original vetted credential. A successful transfer results in the new device having "derived credentials".

There is, however, no current solution for derived credentials, nor for remote attestation of a security module's Level of Assurance, which would be useful for network connected IoT devices which are headless, e.g., have no means for a human interface, to be accurately identified and authenticated as to the Level of Assurance they can support for security protection while being used in critical applications.

SUMMARY OF THE INVENTION

The invention meets these needs by incorporating the issuance of a digital certificate onto a security module, within a security certified or protected manufacturing environment such that witnesses can attest that public key pairs were generated by the HSM itself and not imported, and therefore that they are unique to that particular physical module. This establishes a first level of identity trust in the HSM.

DETAILED DESCRIPTION

Figure 1:
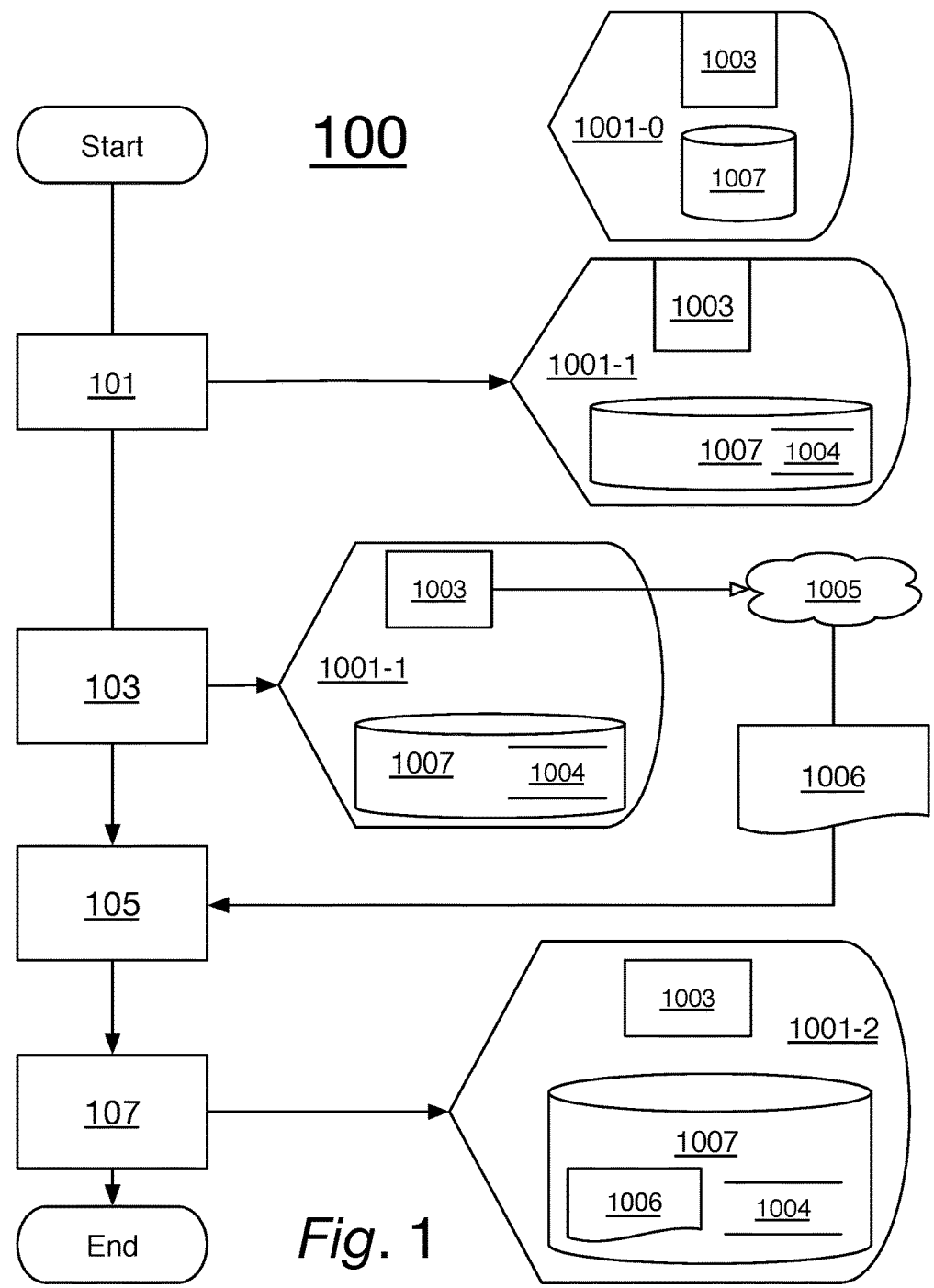
FIG. 1 is a flowchart of the method of the invention allowing remote attestation of Authorization Level Credentials from a hardware security module.

The invention incorporates the issuance of a digital certificate onto a hardware security module, such as the Rosetta HSM manufactured by SPYRUS, Inc. of San Jose, within a security certified or protected manufacturing environment such that witnesses can attest that public key pairs were generated by the HSM itself and not imported, and therefore they are unique to that particular physical module. This establishes a first level of identity trust in the HSM, and allows remote interrogation of the HSM to ascertain its identity and Authentication Level.

The certification of the HSM to a known standard, such as the FIPS 140-2 Level 3 or Level 4 establishes a further degree of confidence in the robustness of physical and electronic security that will be provided by the HSM in executing and storing critical security parameters such as private keys and symmetrical keys used for encryption. A third level of security is supported by characteristics that are embedded in subject or extension fields of an X.509 (or other standard) digital certificate request and key pair that is created with the HSM and sent to a trusted root certificate authority ("CA") for signing by the CA private key.

The HSM certificate format is constructed to contain device specific characteristics such as serial number, place of manufacture, an attribute identifying the security of the manufacturing environment, and reference to a Certificate Policy that defines how the certificate and therefore the key pair can be used. This Certificate Policy can be a legal contract between the parties to enforce that the certificate and the keys will only be used in a specified manner. Another field identifies any certifications for the HSM to assert that it possesses the security necessary to maintain a Level of Assurance 4 or some other standard of security agreed to, based on its level of FIPS certification. As one example, the U.S. NIST Cryptographic Module Validation Program (CMVP) provides a rigorous validation of cryptographic hardware modules to FIPS 140-2 Levels Security Requirements for Cryptographic Modules as mandatory standards for protection of sensitive data in federal agencies. It is also widely used by other countries and industry as a metric for the quality of data protection.

However, until this disclosure there has been no trustworthy method yet developed for a hardware security module to electronically attest to a specific assertion of its certification(s) remotely through a network. Currently, FIPS certification of an HSM can be accessed online at the NIST web site for customers to check. Confirming key generations and protection within a HSM is also currently limited to a third party witness during the issuance process. When the user, the module and the issuing authority are collocated, this is a viable, but manual, process subject to human error. The invention addresses this shortcoming and permits remote and accurate verification of credentials and assurance that the public/private key pair was generated within the HSM without the need for human witnessing.

With reference to FIG. 1, in method 100 of the invention an HSM 1001-0 is initialized and provisioned by a vetted person without the existence of a prior initialized HSM. HSM 1001-0 is then attached to a host computing device (not shown), and in step 101 is provisioned by cryptographic software such as Crypto Service Provider by Microsoft, or some other standards based software such as PKCS #11, or other equivalent cryptographic software services known to one of ordinary skill in the art, to create a device attestation public key pair (DAKP) 1004 and optionally, a symmetric encryption key on the hardware security module at the point of manufacture of the HSM.

The vetting of the HSM provisioner can be determined by the security policies of the organization. For rigorous or classified government security applications, this is preferably done by vetted personnel with clearances and on a host computing device which is not network connected so that the keys remain within the HSM until they are exported under controlled secure conditions. Witnesses can thus attest that the DAKP public key pair was generated by the HSM itself and not imported, and therefore it is unique to that particular physical HSM chip.

With further reference to FIG. 1, in step 103 HSM cryptographic software 1003 is caused to request the issuance of a digital X.509 device attestation certificate (DACert) 1006 from Certificate Authority 1005. This includes within its subject fields or extensions certain attribute information unique to the HSM such as: Vendor ID, Product ID, HSM serial number, CMVP FIPS certification number, HSM public key, and if relevant, other certifications such as Common Criteria and the Commercial Solutions for Classified (CSfC). Also included is a Certificate Policy reference which defines the use of the certificate for device authentication through assertion of its credentials and the fact that the keys were generated solely within the HSM.

The HSM executes all of the cryptographic functions necessary to make a Certificate Request. This includes enforcing that the generation and protection of keys, as well as applying the DAK-Private digital signature to the Certificate Request, are all executed only within the HSM security boundary. The CA Signed X.509 certificate is returned to the HSM in step 105 for insertion into its read/write storage 1007 in step 107. A device attestation certificate path (DACertPath) to the Certificate Authority root of trust is also created to service verification requests of the current ownership of the public key. Both the DACert and DACertPath are stored within the HSM.

This vetted method allows the certificate authority 1005 to electronically confirm the quality (or certified levels) of the HSM 1001-2 and that the cryptographic function(s) and attributes to be signed were generated at a specific level of security quality. If the HSM is certified at the appropriate FIPS level, the certificate authority can trust this information and, if desirable or required, assert the appropriate Level of Assurance policy identifier within a subject field or extension of the certificate.

Figure 3:
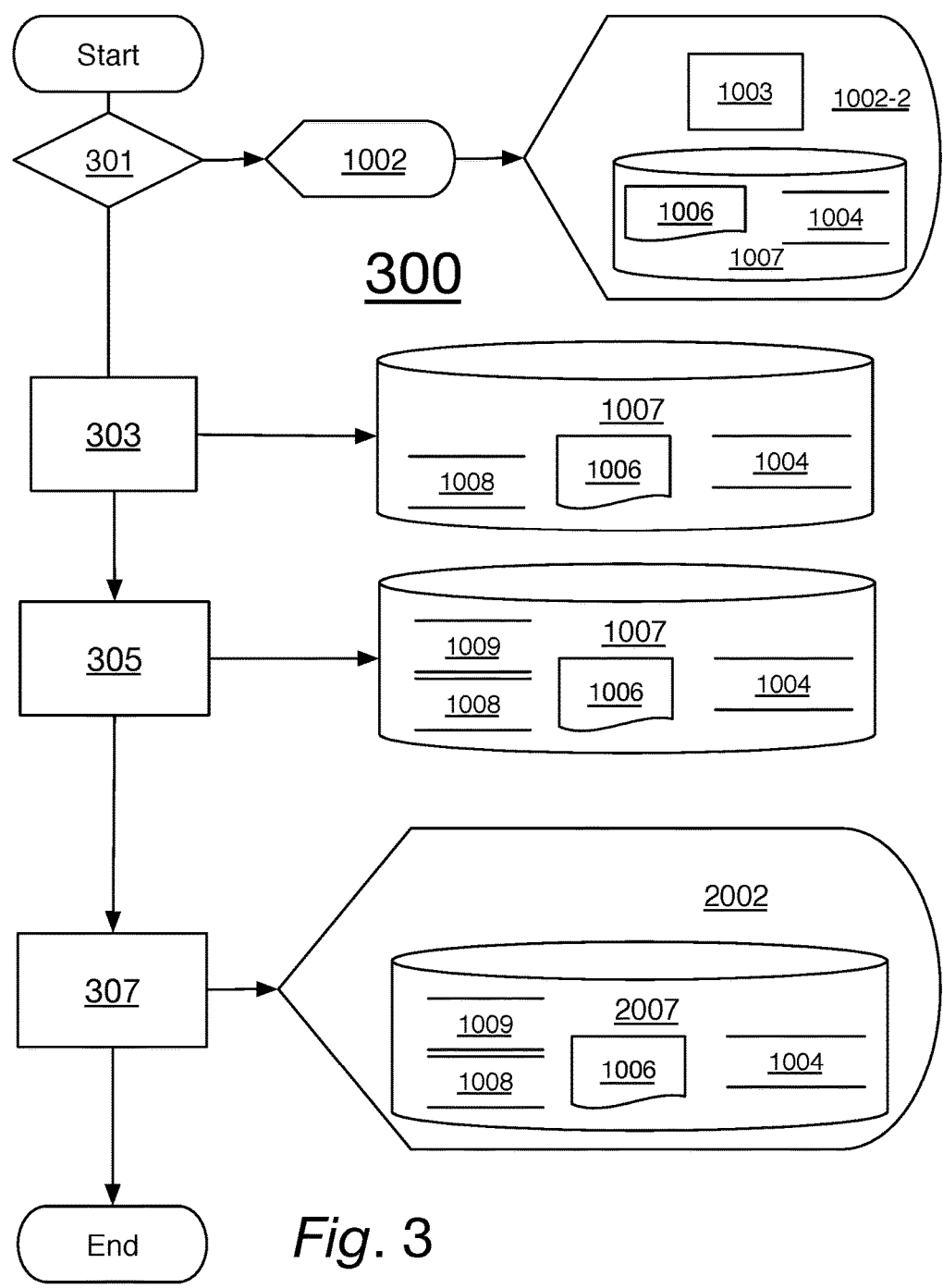
FIG. 3 is a flowchart of a further embodiment of the method of the invention as used to transfer Authorization Level Credentials from a first hardware security module to a second hardware security module.

With reference to FIG. 3, for an HSM that has been so provisioned and connected to a host computing device (in step 301), step 303 generates internally an asymmetric user RSA or ECC key pair (UKP) 1008 for its intended purpose (e.g., encryption, digital signature, authentication protocols) by a user as defined by a Certificate Policy reference. The user public key (UKP-Public) will be signed in step 305 by the device attestation key, DAK-Private 1004 to create an attestation signature 1009. The command that retrieves the public key will retrieve both the public key and the attestation signature.

A command to retrieve the attestation certificate (DACert) 1006 and the attestation certificate path (DACertPath) will also be required (or these will simply be in files that can be read using a standard read binary command). The attestation signature 1009 is used by the Certificate Authority to ensure that the certificate it issues (UCert) is for a key generated within the HSM.

If UCert contains an attestation extension, then any relying origination or destination party can re-validate the fact that the key was generated within the HSM. If they want to validate the attestation signature all the way back to the manufacturing, then the extension would need to include enough information to do so (e.g., the attestation signature as well as the DACert reference).

Figure 2:
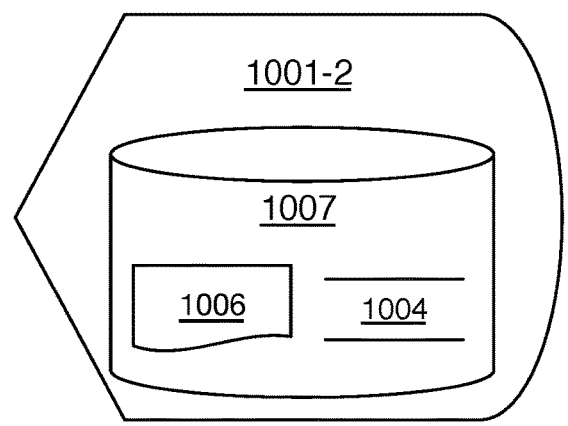
FIG. 2 is a schematic of a hardware security module that meets to requirements of the invention.

The schematic of an HSM1001-2 that is created by the method 100 of FIG. 1, is shown in FIG. 2.

Derived Credentials

With reference to FIG. 3, in a second embodiment where the Level of Assurance is to be transferred from one HSM 1002 to a destination device HSM 2002, the DAKP, DACert, and DACertPath are created as previously described. If HSM 1002 is determined not to be properly provisioned, it can be by application of method 100. In deriving the same Level of Assurance as was assigned to the previous vetted credential in HSM 1002-2, the next step 303 will generate internally an asymmetric user RSA or ECC key pair (UKP) 1008 for its intended purpose (e.g., encryption, digital signature, authentication protocols) for a user as defined by a Certificate Policy reference.

As noted above, the user public key (UKP-Public) 1008 will be signed by the device attestation key, DAK-Private 1004 to create an attestation signature 1009. The command that retrieves the public key will retrieve both the public key and the attestation signature. A command to retrieve the attestation certificate (DACert) 1006 and the attestation certificate path (DACertPath) will also be required (or these will simply be in files that can be read using a standard read binary command).

The UKP Certificate Request will contain user information that will be extracted from the smart card such as user organization, user name, user ID, user contact information, permissions and signed by the UKP-Private and sent to the Certificate Authority. The attestation signature is used by the Certificate Authority to ensure that the certificate it issues (UCert) is for a key generated within the HSM.

Therefore, for a given user key generation there will be a user key pair (UKP), a user certificate (UCert) and a user certificate path (UCertPath). If UCert contains an attestation extension, then any relying party can re-validate the fact that the key was generated within the HSM. If the attestation signature is to be validated all the way back to the manufacturing, then the extension would need to include enough information to do so (e.g. the attestation signature as well as the DACert reference).

In step 307 the signed device attestation certificate 1006, device attestation public key pair 1004, user key pair 1008, and attestation signature 1009 are transported to the second hardware security module 2002.

Algorithm

One embodiment of an algorithm that can be executed to prove that cryptographic keys are always contained within a hardware security module device or are transported with the wrapped protection of hardware created keys follows:

In a secure environment, keys are verified to be generated on the HSM, and verified hardware keys are issued a digital certificate, which contains the policy identifier indicating at least that:

The key was generated on an HSM—key origin is hardware

The key is to be used for proof of possession, proof of origin and proof of destination for keys generated by the HSM The device with its associated key and certificate are released or purchased by an end user A new user key is generated; the HSM's hardware key digitally signs the user public key. This digital signature can be used to verify that the user key was generated in hardware.

The origin of the device key can be verified.

The device key will only be used to sign public keys it generates on board, unwrap keys to be loaded and possibly to prove possession of the device private key via challenge/response protocols The device key can never be exported The device key cannot be deleted The device key cannot be changed; if it can be changed strict control of how that key can be changed is required. For example, it should only allow import of a key that can be proven to have been generated in hardware. Alternatively, changing the key could involve another onboard key generation with a new certificate issued to that key.

The signed user public key is sent with a signed certificate request to a CA (the request is signed by the new user private key in the usual way)

The CA can verify proof of possession of the user private key by validating the signature on the certificate request (in the usual way, this is normal certificate issuance).

The CA can verify the hardware backed origin by validating the device key signature on the user key public along with the device key's digital certificate and its policy id's If a user key is to be loaded onto the HSM from a key distribution server, the system can ensure that the new key wrapped for transport can only be unwrapped within an HSM through the steps of:

An HSM key is established as described above

The origin of this new key is not critical to proof of destination described here A key distribution server gets the target HSM's device certificate The validity and policy ID's in the certificate are verified by the server, e.g. device key verified to be generated in hardware and can be used to import/export with proof of origin and destination.

A proof of possession of the device private key can be performed using a challenge/response protocol between the key distribution server and the device.

The new user private is securely wrapped for transport using the HSM public key.

The wrapped user key is loaded onto the HSM.

The HSM uses its private key to unwrap the new user key and stores it securely on board.

Thus, the vetted and signed assertions made for the origination credential are extended to the destination device HSM with the signing authority of the device certificate; hence the credentials are "derived" and protected by the described cryptographic methods, and inspection of the DACert provides the assertion of the trust level of the HSM.

In another embodiment where the HSM will be employed by an inanimate origination or destination device rather than a human person, e.g., a smartphone or an IoT controller such as a Raspberry Pi, and there is to be no binding between the HSM and the host computing device, e.g., the HSM is portable and may be used by different host computing devices, the method is the same as in the previous embodiment with regard to the creation and provisioning of the HSM.

This vetted method allows the certificate authority to electronically confirm the quality (or certified levels) of the HSM and that the cryptographic function(s) and attributes to be signed were generated at a specific quality level. If the HSM is certified at the appropriate FIPS level, the certificate authority can trust the identification information and, if desirable or required, assert the appropriate Level of Assurance policy identifier within a field or extension of the certificate. Whether the HSM is used at the point of origination or destination of a transaction, its level of trust can be asserted by inspection of the DACert.

If the HSM is to be dedicated to a specific host computing device, for example an IoT controller such as the Raspberry Pi, or a smartphone, then the HSM can be strongly bound to the device. In one implementation, during initialization and provisioning of the HSM connected to a host computing device operating in a pre-boot phase, the HSM cryptographic software requests the creation of a digital X.509 device attestation certificate (DACert), from a network connected Certificate Authority. This request will include, in addition to attribute information unique to the HSM, identification data unique to the specific destination host computing device such as serial number and firmware MAC for inclusion into the fields or extensions of the DACert.

An application can then read the destination device identification data from the destination host computing device and, after retrieving DAKP-Public from a file directory, compare it to the same data within the signed DACert and if there is a match, then the application, e.g., a device logon or a communications protocol, can continue. If there is no match, the connection or application fails to execute or the device operating system is not opened or activated.

Other techniques known to persons of ordinary skill in the art can be used to bind a host computing device to the HSM. One example uses the Shamir secret sharing algorithm where a combined set of host device attributes and HSM attributes constitute K elements in a K of N algorithm. If K elements are present and constitute the correct combination of host computing device and HSM attributes, the secret is reconstituted and is used to decrypt a logon key, previously encrypted by the secret, and the application proceeds to access and execute on the host computing device.

This method vetting the HSM only when it is attached to a specific host computing device can be implemented whether the HSM is a peripheral module or is embedded within the host device. Also included in the certificate is a Certificate Policy reference which defines the use of the certificate for device authentication through assertion of its credentials and the fact that the keys were generated solely within the HSM.

In yet another embodiment, where a host computing device is located remotely from a control center and contains a partially initialized HSM which is to be bound to the host device, a different method is used. During the manufacturing of the HSM, the Device Attestation Key Pair (DAKP) is generated as described previously but the Certificate Request is not yet made. This covers the situation where the HSM has been manufactured and been subsequently sent to a host computing device manufacturer who incorporates the HSM into the device and then sells it to a system integrator or end user who then deploys the devices.

Once deployed, a connection is established between the host computing device and a remotely located host computing device at a management control center using public key challenge-response or other authentication techniques well known to those persons of skill in the art. The HSM, whether integrated or embedded into or acting as a peripheral to the host device with which it is to be bound, receives, from a program operating on the host device, its identification data.

The HSM combines that with its attributes to create within the HSM, a Certificate Request that is sent by the host computing device to the CA through the connection to the remotely located control center. The signed DACert will also include, in addition to attribute information unique to the HSM, identification data unique to the specific host device such as serial number and firmware MAC.

As described previously, methods to compare the signed attributes in the DACert with those on the device or the Shamir secret sharing method to unlock the operating system can be employed as means to bind a remotely located host device to its peripherally attached or embedded HSM and the DACert attests to the level of trust associated with the HSM.

The methods described achieve, first, the means to electronically assert, from a local or remote station, e.g., a control center, without human intervention, that HSM keys used for device authentication and encryption have been created within the secure boundary of an HSM by the manufacturer or initializing provisioner of the HSM.

Second that any subsequent cryptographic key generation for a certificate request has been created within the secure boundary of an HSM by the owner of the HSM.

Third, that the HSM can electronically assert that its robustness of security has been certified at a specific level to inform a relying party of the Level of Assurance being supported for establishing confidence and trustworthiness.

Fourth, that the HSM can be mobile or can be cryptographically bound to a specific host computing device either before or after deployment.

Those skilled in the art will appreciate that special hardware circuits such as Application Specific Integrated Circuits (ASICs) or Digital Signal Processors (DSPs) may be used in practice to implement some or all of the functionality of all components or steps of the present invention. It should be noted that the described embodiments are exemplary rather than limiting the present invention. Substitute embodiments may be designed by those skilled in the art without departing from the scope of the claims enclosed.

The invention claimed is:

1. A method for manufacture of a hardware security module having a Level of Assurance and cryptographic software and storage within a secure boundary, which can remotely attest to its Level of Assurance, comprising the steps of:
   a) creating a provisioned security module by provisioning a hardware security module to create a device attestation public key pair within the boundary of the hardware security module, said device attestation public key pair comprising a public key and a private key;
   b) creating a signed certificate request by causing the cryptographic software within the provisioned security module to sign a request to a certificate authority with the private key of the device attestation public key pair, said request being for the issuance of a device attestation certificate which includes certification of the hardware security module's Level of Assurance;
   c) enabling the hardware security module to transmit the signed certificate request to the certificate authority;
   d) enabling the hardware security module to receive a signed device attestation certificate from the certificate authority responsive to the transmitted signed certificate request;
   e) enabling the hardware security module to insert the signed device attestation certificate into the cryptographic storage;
   f) enabling the hardware security module to service remote verification requests for the current ownership of the public key of the device attestation public key pair; and
   g) enabling the hardware security module to service remote requests for the hardware security module's Level of Assurance by inspection of the signed device attestation certificate.

* * * * *